Feb. 15, 1938. H. KÜPPENBENDER 2,108,751
PHOTOGRAPHIC DEVICE
Filed April 23, 1937  2 Sheets-Sheet 2
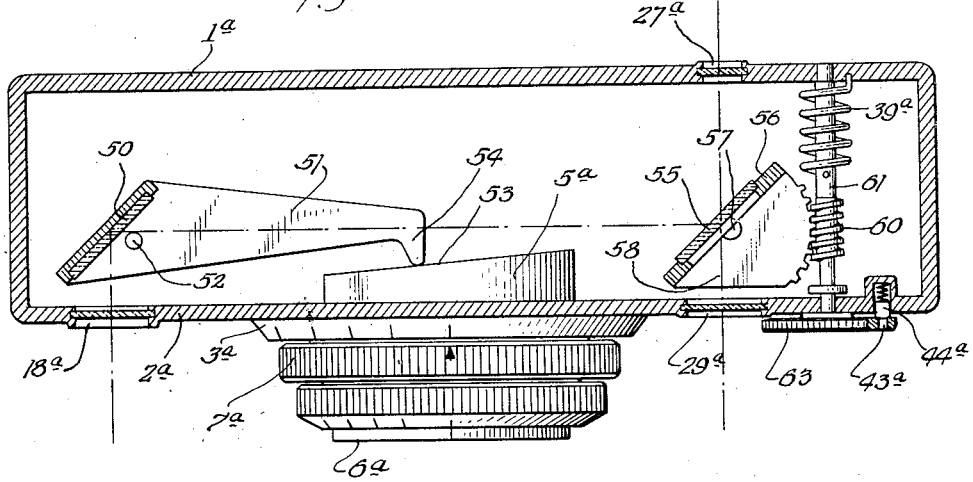
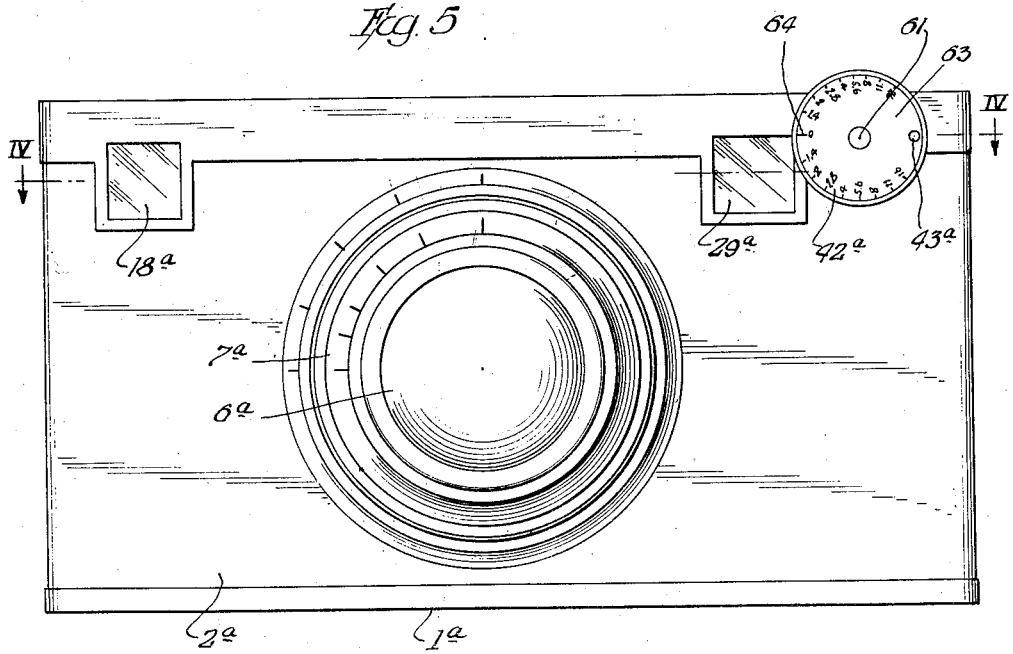
Inventor
Heinz Küppenbender
by B. Singer
Attorney Patented Feb. 15, 1938

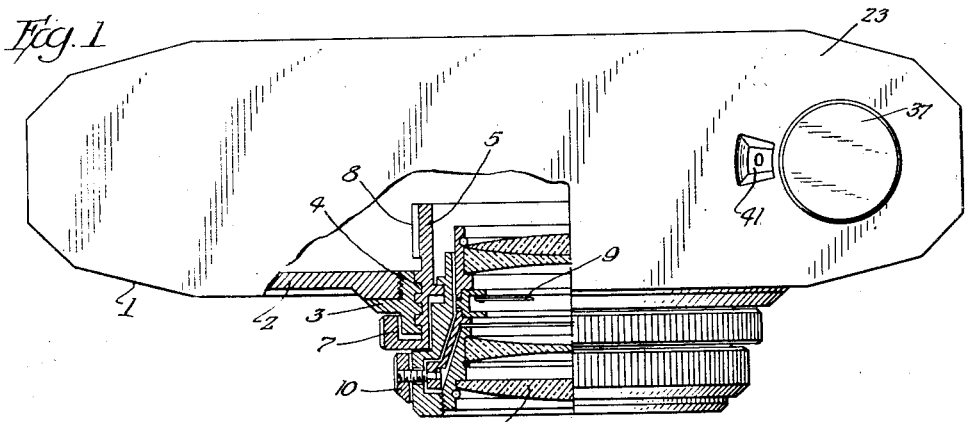
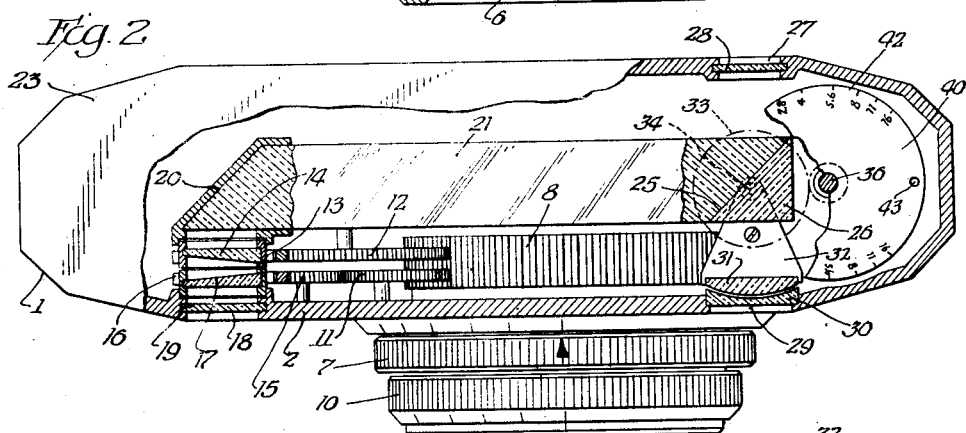
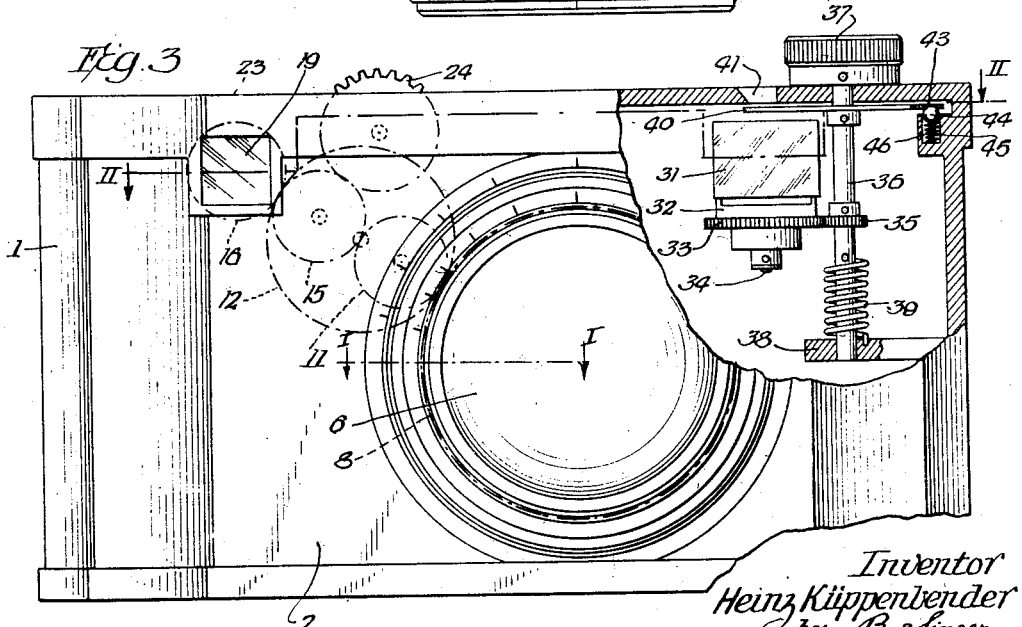

2,108,751

UNITED STATES PATENT OFFICE 2,108,751

PHOTOGRAPHIC DEVICE

Heinz Küppenbender, Dresden, Germany, assignor to Zeiss Ikon Aktiengesellschaft, Dresden, Germany Application April 23, 1937, Serial No. 138,563
In Germany February 22, 1936

13 Claims. (Cl. 95—44)

The invention relates to improvements in photographic devices and particularly is directed to a device for focusing the photographic lens system on a camera by means of a range finder of the home base type.

It is well known that in a range finder of this type there are produced at two spaced points images of the object to be photographed and that these images are brought into registration by ray-deflecting means. The simultaneous observation of the two images when the same are brought into registration is effected by means of mirrors or prisms, whereby the deflection of the rays may be effected either by the rotation of a mirror, by a totally reflecting prism, or by a glass wedge having a variable angle, for instance in the form of a pair of wedges or a pair of lenses. When employing this measuring method, it is only possible to bring images into registration which are produced from parts located in the same plane of the scene to be photographed. All parts located outside of this defined plane do not come into registration in the combined image which is observed in the range finder. Therefore, a range finder of this type does not possess a depth of focus as it is known from a lens system.

If now the range finder is coupled with the lens system of a photographic camera for the purpose of focusing the lens system, then the range finder constitutes a measuring instrument which, as far as the lens system is concerned, operates too accurately. This is so, because the lens system due to its depth of focus will portray parts of the object or scene to be photographed with sufficient sharpness which parts when observed through the range finder do not appear to be in registration with each other.

It is now an object of the invention to provide a camera with a range finder of the type referred to, which is coupled with the lens system and focuses the latter when a ray deflecting means in the range finder is adjusted until the two images of the object are in registration with each other.

Another and very important object of the invention is to employ the range finder, which is coupled with the lens system, for determining the correct size of the diaphragm opening which is required for adjusting the lens system for the desired depth of focus. For this purpose the range finder is provided with another adjustable ray deflecting means which is entirely independent of the customarily provided ray deflecting means and the means for adjusting the lens system and diaphragm respectively.

In accordance with another object of the invention the additionally provided adjustable ray deflecting means is arranged in front of the ordinarily stationary reflecting face of the prism base of the range finder, or if the reflecting face comprises an ordinarily stationary mirror the same may be made adjustable for the purpose of forming the required additionally adjustable ray deflecting means.

The additional adjustable ray deflecting means is manually operated after the range finder and thereby the lens system have been adjusted with respect to the desired plane of the object or scene to be photographed. For determining the $f$ stop or diaphragm opening which is necessary to obtain a photographic picture with the desired depth of focus, the photographer then adjusts the aforesaid additional adjustable ray deflecting means until two images of another object which is positioned in the foreground or in the background of the first object and which it is desired to appear in the photographic picture sharply defined, are brought into registration with each other. When this condition is obtained a scale associated with the additional adjustable ray deflecting means indicates the $f$ stop or diaphragm opening which has to be selected.

It is a further object of the invention to provide the additional adjustable ray deflecting means with means for automatically returning said ray deflecting means after adjustment into its initial position.

A still further object of the invention is to provide the additional adjustable ray deflecting means with means adapted to arrest the ray deflecting means in its initial position when it is moved by said returning means.

It is also an object of the invention to provide a range finder of the home base type which may be used with any camera and which does not only determine the distance of the object to be photographed, but also is adapted to determine the required $f$ stop or diaphragm opening of the lens system for a desired depth of focus of the photographic picture obtainable from the object whose distance has been determined.

Other objects relate to various features of construction and arrangements of parts which will appear more fully hereinafter.

The nature of the invention will be understood from the following specification with reference to the accompanying drawings in which:

Fig. 1 illustrates a top view of a photographic camera provided with a range finder which is coupled with the lens system, a portion of the top wall of the camera being broken away, and a portion of the lens system being shown in section, substantially on the line I—I of Fig. 3.

Fig. 2 is also a top view of the camera, but substantially in section on the broken line II—II of Fig. 3.

Fig. 3 is a front elevation view of the photographic camera, with a portion of the front wall and a portion of the lens system broken away to illustrate the additional adjustable ray deflecting means associated with the range finder.

Fig. 4 illustrates a modified embodiment of the invention substantially in horizontal section on the broken line IV—IV of Fig. 5, and Fig. 5 is a front elevation view of the camera illustrated in section in Fig. 4.

According to Fig. 1 the camera casing 1 is provided with a front wall 2 having attached thereto a mounting ring 3 for the lens system 6. The mounting ring 3 is provided with an interior worm thread 4 engaging a corresponding exterior thread on the mounting sleeve 5 of the lens system 6. Upon rotation of the mounting sleeve 5, which is provided for this purpose with a knurled ring 7, the lens system 6 is axially displaced with respect to the mounting ring 3. The inner end of the mounting sleeve 5 is provided with a gear 8 which, as will be described hereinafter, is coupled by a gearing (Figs. 2, 3) with the range finder. The lens system 6 is axially adjusted whenever said gearing during the adjustment of the range finder is operated. The lens system 6 in the present instance is provided with an iris diaphragm 9 adapted to be adjusted by a knurled ring 10 rotatably associated with the lens system 6.

As illustrated in the Figs. 2 and 3, the gear 8 at the inner end of the mounting sleeve 5 meshes with two gears 11 and 12, the latter one of which is larger than the former one and in turn meshes with an annular gear 13 in which is mounted a glass wedge 14. The smaller gear 11 meshes with a gear 15, which in turn meshes with an annular gear 16 arranged coaxially with the annular gear 13 and having mounted therein a glass wedge 17. The rotary glass wedges 14 and 17 are arranged behind an opening 18 in the front wall 2 of the camera casing 1 and in front of the reflecting face 20 at one end of the mirror base which consists of a stationary glass member 21. A glass plate 19 is arranged in the opening 18. It will be noted that due to the arrangement of the gears 11, 12 and 15 the rotary wedges 14 and 17 will be rotated simultaneously in opposite direction whenever the said gears are operated, either by rotating the mounting sleeve 5 or by rotating a gear 24 which meshes with the gear 15 (Fig. 3) and projects with a portion of its circumference out of the top wall 23 of the camera casing 1 to be easily accessible by the user of the camera.

The other end of the mirror base 21 is formed by a reflecting face 25 to which is cemented a rectangular prism 26. A semi-transparent silvered layer is arranged between the reflecting face 25 and the prism 26. Due to this semi-transparent layer it is possible to observe the two images appearing on the two reflecting faces simultaneously from the rear of the camera by looking into an observation opening 27 which preferably is protected by a glass plate 28.

In alinement with the observation opening 27 and the reflecting face 25 of the mirror base there is arranged in the front wall 2 of the camera casing 1 the other inlet opening 29 of the range finder.

In accordance with the present invention there is now arranged for the purpose of determining the f stop or diaphragm opening for any desired depth of focus, a glass wedge of variable thickness in said inlet opening 29 and in front of said reflecting face 25. This glass wedge is composed of a negative lens 30 and a positive lens 31. The negative lens 30 is fixedly mounted in the inlet opening 29, while the positive lens 31 is positioned behind the negative lens 30 on a rotatable support 32 attached to a gear 33 rotatable about a vertical axis 34.

The gear 33 meshes with a gear 35 secured on a rotatable shaft 36 which projects with its upper end through the top wall 23 of the camera casing 1. A knob 37 is attached to the upper end of the shaft 36 by means of which the shaft 36 and therewith the gears 33, 35 may be manually rotated. The lower end of the shaft 36 is rotatably supported by a bearing bracket 38 and is surrounded by a spring 39 which is adapted to return the shaft 36 into its zero or initial position. One end of the spring 39 is attached to the shaft 36 and the other end is anchored at the bearing bracket 38. A disc 40 provided at its upper face with a scale 42 indicating diaphragm openings in f stops is secured to the upper end of the shaft 36 just below the top wall 23 of the camera casing. An aperture 41 in said top wall 23 permits the reading of said scale, and as illustrated in Fig. 1 the aperture 41 is of just sufficient size to permit the numbers of the scale to appear one at a time. For the purpose of arresting the pivotally mounted positive lens 31 in its normal or zero position, as illustrated in Fig. 2 and as indicated by the scale indication "0" in Fig. 1, the disc 40 is preferably provided with an aperture or recess 43 into which a ball 44 is adapted to enter. The ball 44 and a spring 45 for urging the ball into engagement with the disc 40 are seated in a socket 46 formed in the camera casing.

It will be noted from Fig. 2 that the scale 42 extends from the "zero" mark in both circumferential directions of the disc 40. This is necessary because the positive lens 31 is adapted to be rotated in both directions, depending upon whether the depth of focus is determined with respect to an object in the foreground or background of the principal object to be photographed.

The operation of the camera for focusing the lens and obtaining a picture of the desired depth of focus is as follows:

The camera is directed toward the object or scene to be photographed, and by looking into the observation opening and rotating the ring 7, or if more convenient by rotating the gear 24, the range finder is adjusted until the two images appearing in the same are brought into superposition. When this condition has been obtained the range finder has been adjusted to the correct distance and simultaneously therewith the lens system has been focused. If it is now desired to obtain a picture in which certain parts in the foreground of the object appear sharply defined, then it is necessary to determine the diaphragm opening which will cause this result. For this purpose the knob 37 operating the pivotally mounted positive lens 31 is rotated until the two images of the aforementioned parts in the foreground of the object appear in superposition when looking into the observation opening 27 of the range finder. When this condition has been obtained the number appearing in the opening 41 indicates the opening or *f* stop for which the diaphragm 9 of the lens system 6 has to be adjusted. When the knob 37 is released the spring 39 returns the knob and therewith the positive lens 31 to its zero or initial position in which the images of the object upon which the lens system has been focused appear again in superposition. In this position the range finder is ready for focusing the lens system upon another object.

It will be noted, that during the adjustment of the additional ray deflecting means 31 the previously obtained focus adjustment of the lens system 6 is not disturbed.

The Figs. 4 and 5 illustrate a modified embodiment of the invention in which a range finder of the mirror base type is employed. In such a range finder the deflection of the measuring rays is caused in known manner by one of the mirrors which is rotatably adjustable about an axis.

According to Fig. 4 the adjustable mirror 50, which is arranged behind the opening 18a in the front wall 2a of the camera casing 1a, is mounted on a lever 51 which is rotatable about an axis 52. The inner end of the axially adjustable mounting sleeve 5a of the lens system 6a is provided with a cam 53 against which the free end 54 of the lever 51 is continuously urged by spring means or the like, not shown. The other mirror 55 of the range finder is ordinarily stationary in the known range finder of this type, but according to the present invention is likewise pivotally mounted. The mirror 55 is attached to a support 56 which is rotatable about a vertical axis 57 and is attached to a gear segment 58. The mirror 55 is arranged behind the other opening 29a in the front wall 2a of the camera casing 1a and is provided with a semi-transparent silvered layer. When looking into the observation opening 27a arranged in the rear wall of the camera casing 1a two laterally displaced images of the object to be photographed will appear on the mirror 55 when the lens system 6a is out of focus. The lens system 6a is focused by rotating the sleeve 5a by means of the ring 7a until the two images are brought into registration with each other.

After the focusing of the lens the correct diaphragm opening for obtaining a certain depth of focus of the picture to be produced is determined by adjusting the mirror 55 until two images of another object in the foreground or the background, as the case may be, and which is to appear sharply defined in the picture are brought into registration in the range finder.

The mirror 55 is rotatably adjusted by a worm 60 which meshes with the gear segment 58 and is secured on a shaft 61 rotatably mounted in the camera casing 1a. One end of the shaft 61 extends through the front wall 2a of the camera casing 1a and has secured at its outwardly extending end a disc-like knob 63 by means of which the shaft 61 is manually rotated. The outer face of the knob 63 is provided with a zero mark 64 and a double diaphragm scale 42a, indicating *f* stops, of the same type as the disc 40 in the first described embodiment of the invention. The shaft 61 is also surrounded by a spring 39a for automatically returning the shaft 61 and therewith the knob 63 and the mirror 55 to "0" position, when after determining the diaphragm opening the knob 63 is released by the user. In the same manner as in the first described embodiment the disc-like knob 63 is arrested in its "0" position by a spring-influenced member 44a entering an aperture or recess 43a provided in said knob 63.

While in the described embodiments of the invention the range finder is located in a portion of the camera casing and is operatively coupled with the photographic lens, it is also contemplated by the present invention to arrange all the parts which constitute the range finder in a separate casing, thereby providing a range finder which is adapted to be used with any desired camera. It is, of course, obvious that the operative connection between the first ray deflecting means and the lens system has to be omitted and that the distance scale which in the described embodiments is arranged on the lens mounting 3 and 3a respectively has to be transferred to another member, for instance the manually operable gear 24 if rotary wedges are used as ray deflecting means. Such changes of the arrangement of parts are believed to be clearly within the scope of the present invention.

What I claim as my invention is:

1. In a photographic camera, in combination, a casing, an axially adjustable lens system attached to said casing, an adjustable diaphragm for said lens system, a base range finder producing at two spaced points images of an object to be photographed, the range finder being located in said casing, said range finder being provided with ray deflecting means for bringing the two spaced images into superposition, means to permit the superpositioned images to be observed, manually operable means for adjusting said lens system and said ray deflecting means simultaneously, said range finder including a second ray deflecting means independently adjustable of said first named ray deflecting means, for temporarily bringing into superposition the images of another object in the same picture field, which object, however, is spaced from the lens system a distance different from the distance of said first named object, the position of said second ray deflecting means when adjusted upon said second object indicating the required diaphragm opening to which said diaphragm has to be adjusted to obtain from the first object a photographic picture whose depth of focus extends to said second object.

2. In a photographic camera, in combination, a casing, an axially adjustable lens system attached to said casing, an adjustable diaphragm for said lens system, a base range finder producing at two spaced points images of an object to be photographed, the range finder being located in said casing, said range finder being provided with ray deflecting means for bringing the two spaced images into superposition, means to permit the superpositioned images to be observed, manually operable means for adjusting said lens system and said ray deflecting means simultaneously, said range finder including a second manually operable ray deflecting means independently adjustable of said first named ray deflecting means, for temporarily bringing into superposition the images of another object in the same picture field, which object, however, is spaced from the lens system a distance different from the distance of said first named object, the position of said second ray deflecting means when adjusted upon said second object indicating the required diaphragm opening to which said diaphragm has to be adjusted to obtain from the first object a photographic picture whose depth of focus extends to said second object, and means for automatically returning said second ray deflecting means to a position in which the superposition of the two images of said first object is restored.

3. In a photographic camera, the combination with an adjustable camera lens system and an adjustable diaphragm for said lens system, of a base range finder including two spaced image receiving and reflecting means including adjustable ray-deflecting elements, one of the same directing the image of the object to be photographed along the base of the finder toward the other image receiving and reflecting means, for bringing the two images into superposition, means for permitting observation of the two superposed images, and two manually operable means, one for adjusting said lens system and the deflecting elements of one of said image receiving and reflecting means simultaneously for bringing predetermined portions of said superposed images into registration, the other manually operable means being operative for adjusting the deflecting elements of the other image receiving and reflecting means, for bringing the images of a second object in the same picture field into registration, said second object being spaced from the camera lens system a distance different from the distance of the object to be photographed, means cooperating with said last named manually operable means, when adjusted as described, for indicating the aperture to which said diaphragm has to be adjusted to obtain from the first object a photographic picture whose depth of sharpness extends to said second object.

4. In a photographic camera, the combination with an adjustable camera lens system and an adjustable diaphragm for said lens system, of a base range finder including two spaced image receiving and reflecting means including adjustable ray-deflecting elements, one of the same directing the image of the object to be photographed along the base of the finder toward the other image receiving and reflecting means, for bringing the two images into superposition, means for permitting observation of the two superposed images, two manually operable means, one for adjusting said lens system and the deflecting elements of one of said image receiving and reflecting means simultaneously for bringing predetermined portions of said superposed images into registration, the other manually operable means being operative for adjusting the deflecting elements of the other image receiving and reflecting means, for bringing the images of a second object in the same picture field into registration, said second object being spaced from the camera lens system a distance different from the distance of the object to be photographed, means cooperative with said last named manually operable means, when adjusted as described, for indicating the aperture to which said diaphragm has to be adjusted to obtain from the first object a photographic picture whose depth of sharpness extends to said second object, and means for automatically returning said last named manually operable means including its respective image receiving and reflecting means to a position in which the registration of said predetermined image portions of the first object is restored.

5. In a photographic camera, the combination with an adjustable camera lens system and an adjustable diaphragm for said lens system, of a base range finder including two spaced image receiving and reflecting means including adjustable ray-deflecting elements, one of the same directing the image of the object to be photographed along the base of the finder toward the other image receiving and reflecting means, for bringing the two images into superposition, means for permitting observation of the two superposed images, two manually operable means, one for adjusting said lens system and the deflecting elements of one of said image receiving and reflecting means simultaneously for bringing predetermined portions of said superposed images into registration, the other manually operable means being operative for adjusting the deflecting elements of the other image receiving and reflecting means, for bringing the image of a second object in the same picture field into registration, said second object being spaced from the camera lens system a distance different from the distance of the object to be photographed, means cooperative with said last named manually operable means, when adjusted as described, for indicating the aperture to which said diaphragm has to be adjusted to obtain from said object a photographic picture whose depth of sharpness extends to said second object, means for automatically returning said last named manually operable means including its respective image receiving and reflecting means to a position in which the registration of said predetermined portions of the images of the first object is restored, and means for arresting said manually operable means in its initial position.

6. In a base range finder for photographic purposes, two spaced image receiving and reflecting means including adjustable ray-deflecting elements, one of the same directing the image of the object to be photographed along the base of the finder toward the other image receiving and reflecting means, for bringing the two images into superposition, means for observing the two superposed images, and two manually operable means, one for adjusting the deflecting elements of each said spaced image receiving and reflecting means, that manually operable means adjusting the image receiving and reflecting means which directs the image along the base of the finder being provided with means indicating distances, the other manually operable means being provided with means indicating $f$ stops of a camera objective having a predetermined focal length, said last named manually operable means being operable, after the other manually operable means has been adjusted and the distance of the object determined, for bringing image portions of a second object appearing in the same picture field observable in the finder into registration to determine the $f$ stop of the camera objective for a photographic picture of the first named object having a depth of focus extending to said second object.

7. In a base range finder for photographic purposes, two spaced image receiving and reflecting means including adjustable ray-deflecting elements, one of the same directing the image of the object to be photographed along the base of the finder toward the other image receiving and reflecting means, for bringing the two images into superposition, means for observing the two superposed images, and two manually operable means, one for adjusting the deflecting elements of each said spaced image receiving and reflecting means, that manually operable means adjusting the image receiving and reflecting means which directs the image along the base of the finder being provided with means indicating distances, the other manually operable means being provided with means indicating f stops of a camera objective having a predetermined focal length, said last named manually operable means being operatively connected with its respective image receiving and reflecting means, the f stop indicated when image portions of a second object in the same picture field are brought into registration being the diaphragm aperture required for obtaining a photographic picture of the first object having a depth of focus extending to said second object.

8. In a base range finder for photographic purposes, two spaced image receiving and reflecting means including adjustable ray-deflecting elements, one of the same directing the image of the object to be photographed along the base of the finder toward the other image receiving and reflecting means, for bringing the two images into superposition, means for observing the two superposed images, two manually operable means, one for adjusting the deflecting elements of each said spaced image receiving and reflecting means, that manually operable means adjusting the image receiving and reflecting means which directs the image along the base of the finder being provided with means indicating distances, the other manually operable means being provided with means indicating f stops of a camera objective having a predetermined focal length, said last named manually operable means being operatively connected with its respective image receiving and reflecting means, the f stop indicating when image portions of a second object in the same picture field are brought into registration being the diaphragm aperture required for obtaining a photographic picture of the first object having a depth of focus extending to said second object, and means for automatically returning said f stop indicating manually operable means including its respective image receiving and reflecting means to a position in which the registration of the two image portions of the first object is restored.

9. In a photographic camera, in combination a casing, an axially adjustable camera objective attached to said casing, an adjustable diaphragm for said camera objective and a base range finder in said casing, said casing being provided with an observation window for said range finder and with two fixedly spaced apertures for receiving the measuring rays, said range finder including a ray transmitting and reflecting means in line with one of said spaced apertures and said observation window, and a ray deflecting and reflecting means in line with the other one of said spaced apertures for directing the measuring rays along the base of the finder toward said ray transmitting and reflecting means, manually operable means for adjusting said camera objective and said ray deflecting and reflecting means simultaneously for adjusting the camera objective to the distance of the principal object to be photographed, and a second manually operable means for adjusting solely said ray transmitting and reflecting means, said second manually operable means being coupled with an f stop indicator corresponding to the f stops on said adjustable diaphragm, so that upon re-adjusting the range finder by means of said second manually operable means to a second object in the same picture field, which object is spaced from the camera objective a distance different from the distance of the principal object to be photographed, the f stop indicator indicates the f stop to which said diaphragm has to be adjusted to obtain from the principal object a photographic picture whose depth of focus extends to said second object.

10. A photographic camera provided with an axially adjustable lens system an adjustable diaphragm for said lens system and a base range finder producing at spaced points images of an object to be photographed, said finder being provided at such spaced points of its base with adjustable ray deflecting means, manually operable means for simultaneously focusing said lens system and adjusting one of said ray deflecting means, the other ray deflecting means being coupled with an f stop indicator and being operable for temporarily adjusting the range finder to another object in the same picture field after the distance of the first object to be photographed has been determined with the other ray deflecting means, said other object being spaced from said lens system a distance different from the distance of the first named object, said f stop indicator, upon adjustment of the ray deflecting means coupled with the same, indicating the f stop to which said diaphragm has to be adjusted to obtain from the first object a photographic picture whose depth of focus extends to said other object, said second adjustable ray deflecting means coupled with the f stop indicator including a positive lens and a negative lens, one arranged behind the other and normally producing a zero optical effect, one of said lenses being arranged stationary and the other lens being mounted for rotative movement relatively to the other.

11. In a photographic camera having an adjustable lens system, a base range finder including means for producing at two spaced points images of an object to be photographed and means for combining said images, means adjacent one of said points for deflecting the image at said point to bring the two spaced images into superposition, means adjacent one of said points for viewing said images, manually operable means for adjusting said lens system and said deflecting means simultaneously, and other manually operable means adjacent the other of said points for deflecting the image at said other point to bring two images of another object in the same picture field into superposition without disturbing the adjustment of said first mentioned deflecting means, said another object being spaced from said lens a distance different from that of the first named object, and indicating means cooperating with said other manually operable means for determining the stop opening for the desired depth of focus.

12. In a photographic camera having an adjustable lens system, a base range finder including means for producing at two spaced points images of an object to be photographed and means for combining said images, means adjacent one of said points for deflecting the image at said point to bring the two spaced images into superposition, means for viewing said images, manually operable means for adjusting said lens system and said deflecting means simultaneously, and other manually operable means adjacent the other of said points for deflecting the image at said other point to bring two images of another object in the same picture field into superposition without disturbing the adjustment of said first mentioned deflecting means, said another object being spaced from said lens a distance different from that of the first named object, indicating means cooperating with said other manually operable means for determining the stop opening for the desired depth of focus, and means for automatically returning said second mentioned deflecting means to its initial position when released.

13. In a range finder for photographic cameras, means to produce at two spaced points images of an object to be photographed, means for combining said images, manually actuated means adjacent one of said points for deflecting the image there so as to bring the two images in superposition, means for viewing said images, a second manually actuated means at the other of said points for deflecting the image there for bringing two images of another object in the same picture field that is spaced a different distance from the instrument than the first object, into superposition, and means for indicating the amount of adjustment of each of said manually actuated means.

HEINZ KÜPPENBENDER.